(12) United States Patent
Langston et al.

(10) Patent No.: US 6,367,248 B1
(45) Date of Patent: Apr. 9, 2002

(54) ACTIVE HYDRAULIC CONTROL PRESSURE SYSTEM FOR ADVERSE "G" FLIGHT CONDITIONS

(75) Inventors: Todd Langston; Don Salafia, both of Chandler, AZ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/482,212

(22) Filed: Jan. 12, 2000

Related U.S. Application Data
(60) Provisional application No. 60/161,157, filed on Oct. 22, 1999.

(51) Int. Cl.[7] .............................................. F16D 31/02
(52) U.S. Cl. ............................. 60/413; 60/464; 60/488
(58) Field of Search ........................... 60/413, 453, 456, 60/464, 486, 488; 244/58, 60

(56) References Cited

U.S. PATENT DOCUMENTS

| | | | |
|---|---|---|---|
| 648,592 A | 5/1900 | Metzger | |
| 1,582,896 A | 5/1926 | Berry | |
| 2,238,300 A | 4/1941 | Zand et al. | |
| 2,332,007 A | 10/1943 | Parker | |
| 2,340,489 A | 2/1944 | Pontius et al. | |
| 2,652,812 A | 9/1953 | Fenzl | |
| 2,675,024 A | 4/1954 | Clark | |
| 2,831,490 A | 4/1958 | Simcock | |
| 3,338,138 A | 8/1967 | Wood | |
| 3,338,139 A | 8/1967 | Wood | |
| 3,454,046 A | 7/1969 | Lanctot et al. | |
| 4,913,181 A | * 4/1990 | Mortenson | 60/413 |
| 4,953,663 A | * 9/1990 | Sudgen | 184/6.12 |
| 6,006,776 A | * 12/1999 | Dill | 137/109 |

* cited by examiner

Primary Examiner—Edward K. Look
Assistant Examiner—Thomas E. Lazo
(74) Attorney, Agent, or Firm—Keith Newburry, Esq.

(57) ABSTRACT

An hydraulic control system for an IDG includes in flow series arrangement a scavenge pump, a spool valve and a boost pump. When the spool valve detects an interruption in the supply pressure to the boost pump due to an adverse "g" condition, it reconfigures the system to a closed loop system. In this mode, the oil returning from the CVT is re-circulated back to the boost pump instead of back to the scavenge pump. A small accumulator of oil is used to make up for leakage in the system.

16 Claims, 3 Drawing Sheets

ACTIVE HYDRAULIC CONTROL PRESSURE SYSTEM FOR ADVERSE "G" FLIGHT CONDITIONS

CROSS REFERENCE TO RELATED APPLICATION

This application claims priority to provisional patent application Ser. No. 60/161,157 filed Oct. 22, 1999.

TECHNICAL FIELD

This invention relates generally to integrated drive generators (IDG) used on aircraft that are hydraulically operated and in particular to a method and apparatus for maintaining the flow of hydraulic fluid to the IDG in the event that the aircraft experiences negative or zero "g" conditions.

BACKGROUND OF THE INVENTION

An integrated drive generator, (IDG), is an integral unit having a constant speed drive variable transmission (CVT), or a hydrostat pump and motor, that converts variable speed rotary input from a shaft of an aircraft propulsion engine into a constant speed shaft drive which drives an electrical generator producing constant frequency three phase 400 Hz power. The transmission operates on hydraulic fluid or oil.

Referring to FIG. 1, an IDG 10 includes a casing 12 which acts as an oil sump by collecting hydraulic fluid 26 at its bottom. When hydraulic power is required to drive the CVT, oil from the sum is pumped to the CVT. In a negative "g" condition, the oil is forced from the bottom of the sump to the top and in a zero "g" condition the oil floats in the middle between the top and the bottom. Both of these conditions are referred to as adverse "Cg" conditions and when either occur, the oil pressure at the bottom of the sump drops and the flow is interrupted. Such an interruption of flow or drop in oil pressure to the CVT will result in the CVT being unable to hold a constant generator speed which will cause an automatic shut down of the IDG.

Commercial aircraft experience zero or negative "g" conditions under a variety of circumstances such as severe weather or emergency maneuvers. Clearly, when these circumstances occur it is important that the CVT continue to maintain constant generator speed, otherwise the aircraft will lose electric power. As a consequence, IDGs used on commercial aircraft are typically required to operate normally for a duration of 15 seconds of zero or negative "g" forces.

One method used to meet this 15 second requirement is to provide a second pump for pumping oil from the top of the sump when negative "g" is experienced. This method has had only limited success, because mounted in the sump are a plurality of rotating components which inhibit the flow of oil from the bottom to the top. Instead of the oil flowing smoothly to the top, it gets flung around the casing by these rotating components. Further, this method does not address the zero "g" conditions where oil tends to float in the middle of the sump.

Accordingly, there is a need for a method and apparatus for maintaining for a period of at least 15 seconds the flow of hydraulic fluid to the IDG in the event that the aircraft experiences negative or zero "g" conditions.

SUMMARY OF THE INVENTION

An object of the present invention is to provide an apparatus for maintaining for a period of at least 15 seconds the flow of hydraulic fluid to the IDG in the event that the IDG experiences negative or zero "g" conditions.

Another object of the present invention is to provide a method for maintaining for a period of at least 15 seconds the flow of hydraulic fluid to the IDG in the event that the IDG experiences negative or zero "g" conditions.

The present invention meets these objectives providing an IDG hydraulic system that utilizes in flow series arrangement a scavenge pump, a spool valve and a boost pump. When spool valve detects an interruption in the supply pressure to the boost pump due to an adverse "g" condition, it reconfigures the system to a closed loop system. In this mode, the oil returning from the CVT is re-circulated back to the boost pump instead of back to the scavenge pump. A small accumulator of oil is used to make up for leakage in the system.

A method for providing hydraulic fluid to an integrated drive generator having a constant speed drive variable transmission comprising the steps of during normal "g" conditions pumping said fluid from a sump to said transmission and returning said fluid from said transmission to mix with the fluid from said sump and sensing an adverse "g" condition and in response thereto cease pumping from said sump and re-circulating the fluid returning from said transmission back to said transmission.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
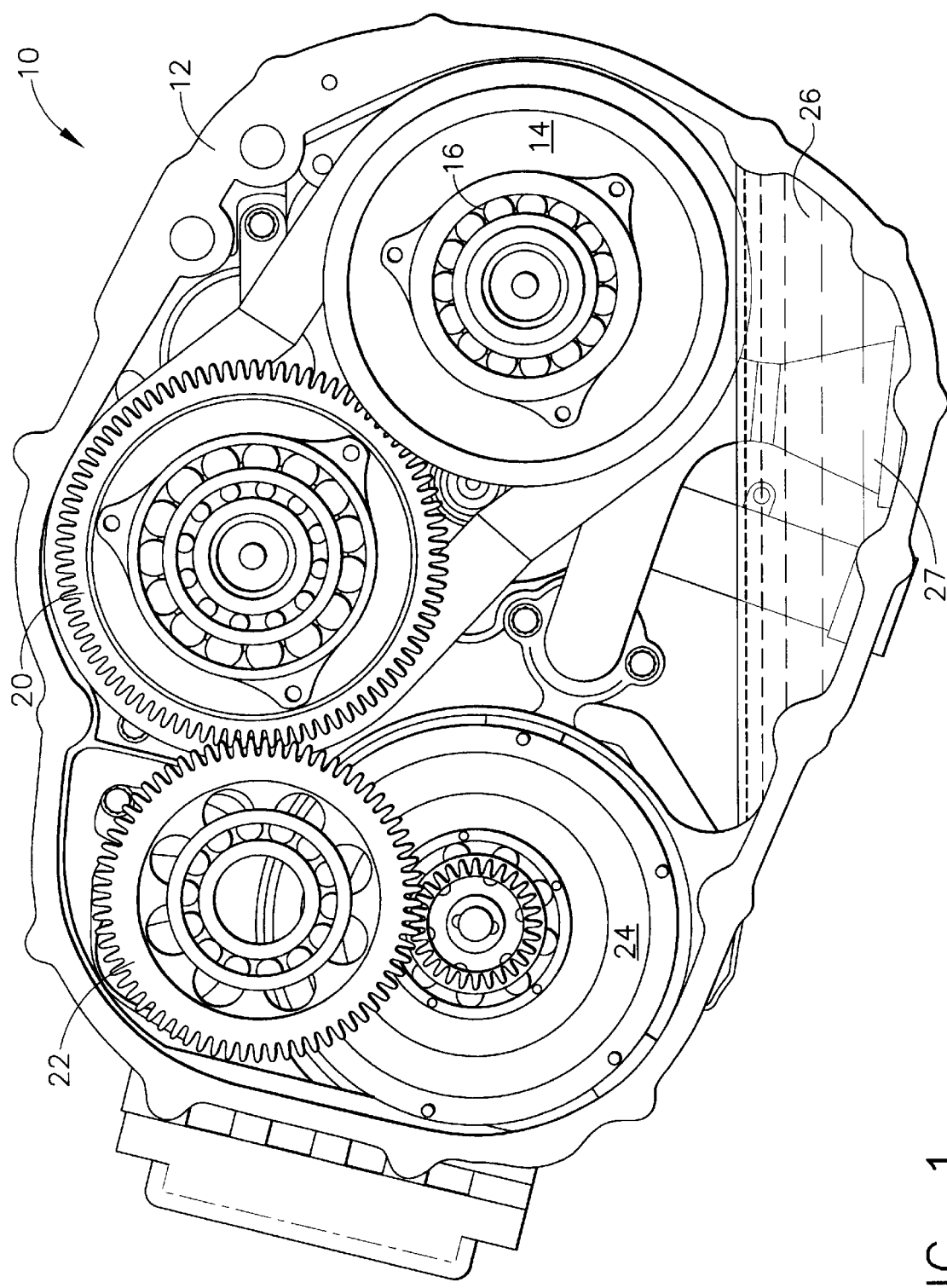
FIG. 1 is a cross section of an IDG of the type that can be used on an aircraft.

Referring to FIG. 1, an integrated drive generator (IDG) is generally denoted by reference numeral 10. The IDG is comprised of a casing or housing 12. Mounted in the casing 12 is a CVT 14 having a input pad 16 that receives a variable speed input and an output gear 20 that drives an idler gear 22 and generator 24 at a constant speed of typically 12,000 or 24,000 rpm. The generator 24 is a conventional brushless generator that produces 400 Hz power. The casing 12 acts as the sump for the hydraulic fluid or oil that is used to control the CVT. During the normal operation the oil collects at the bottom of the casing as represented by hatched area 26.

Figure 2:
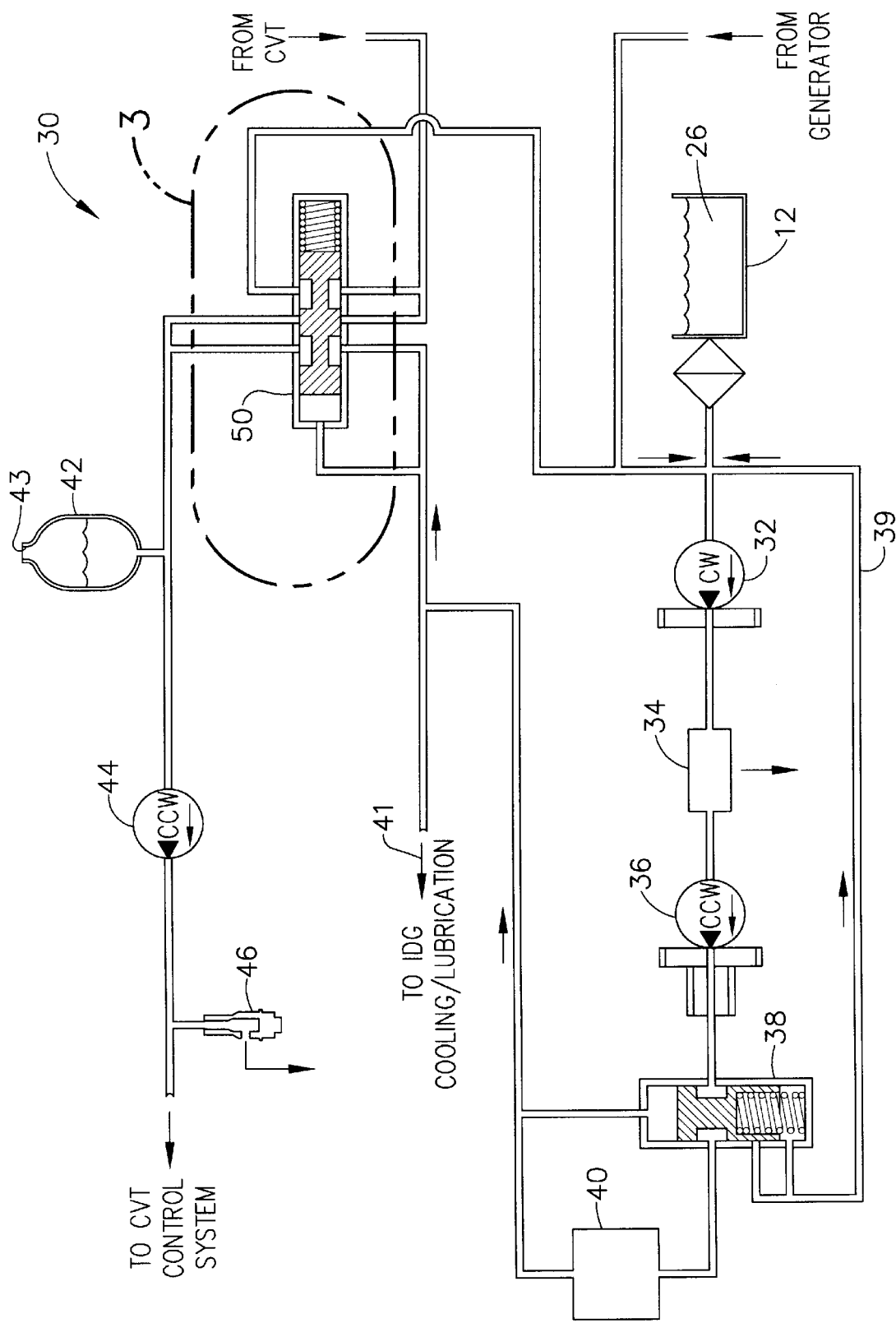
FIG. 2 is a schematic of the hydraulic system contemplated by the present invention.

Referring to FIG. 2, the flow of the hydraulic fluid to the IDG is managed by a hydraulic system 30. Oil is pumped through to oil pickup 27 in the sump 12 by a scavenge pump 32 and then flowed to an air/oil separator 34 which, in a manner familiar to those skilled in the art, removes air from the fluid. From the air/oil separator, the oil flows to a supply pump 36 which pressurizes the oil. A pressure regulator 38 regulates the output of the supply pump to a preferable 65 psi (4.5 bar). A bypass 39 is provided to aid in the warming of the oil when the system 30 is first turned on. From the pressure regulator 38, the oil flows through an external heat exchanger 40 where the oil is cooled. From the heat exchanger 40 approximately 85% of the oil is flowed, as represented by arrow 41, to various parts of the IDG where it is used for cooling and/or lubrication. The remaining 15% flows to a spool valve 50.

Figure 3B:
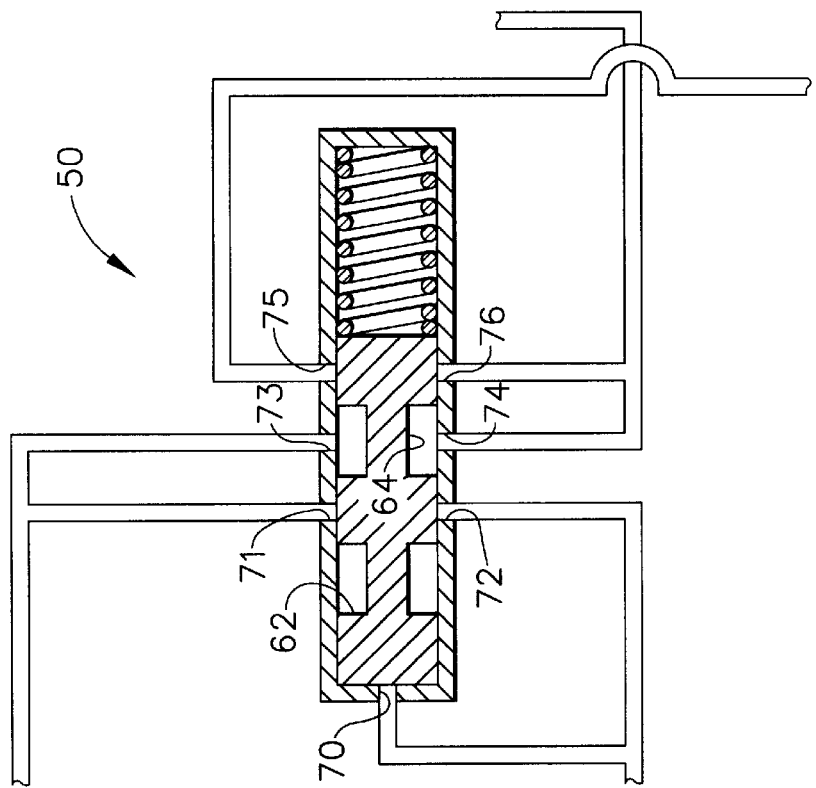
FIG. 3B is an enlarged view of the spool valve of the hydraulic system of FIG. 2 during adverse "g" operation.
Figure 3A:
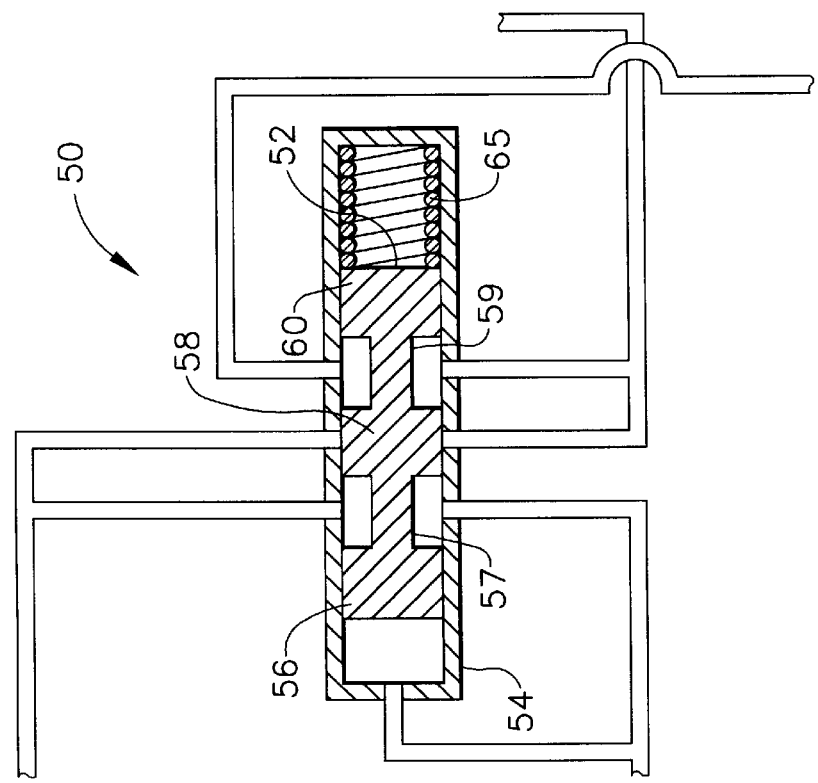
FIG. 3A is an enlarged view of the spool valve of the hydraulic system of FIG. 2 during normal, positive "g" operation.

Referring to FIGS. 3A and 3B, the spool valve 50 is a conventional spool valve having a piston 52 slideably mounted within a casing 54. The piston 52 is comprised of three block portions 56, 58, 60 connected by rod portions 57 and 59. The rod portions have a diameter less than the block portions and the block portions are sized to seal against the inner surface of the casing thereby defining chambers 62 and 64. The axial end of the block portion 56 is adjacent a supply port 70 and the axial end of the block portion 60 is mounted against a spring 65 which is mounted within the casing 54. In addition to the supply port 70, the valve 50 has inlet ports 72, 74, 76 and outlet ports 71, 73, and 75. Inlet port 72 and the supply port 70 receive the 15% flow from the heat exchanger 40 while inlet ports 74 and 76 receive the oil flow returning from the CVT. Outlet ports 71 and 73 communicate with a boost pump 44 which delivers pressurized oil to the CVT. Outlet port 75 communicates back to an intermediate point 31 between the scavenge pump 32 and the sump 12 where the return flow is added to the oil flow from the sump. Between the spool valve 50 and the intermediate point 31, the return flow from the generator 24 is added to the return flow from the CVT 14.

Referring to FIG. 3A, during normal operation the pressure at the supply port 70 is about 65 psi which forces the piston 52 to the right against the spring. This places chamber 62 in fluid communication with inlet port 72 and outlet port 71 and places chamber 64 in fluid communication with inlet port 76 and outlet port 75. Oil from the heat exchanger 40 flows through the inlet port 72, outlet port 71 to boost pump 44 and then to the CVT 14. Oil returning from the CVT 14 flows through inlet port 76, outlet port 75 and then back to the intermediate point 31.

When an adverse "g" condition is encountered, see FIG. 3B, the oil is thrown away from the bottom of the casing 12. As there is no oil to be scavenged from the sump, the pressure at the supply port 70 drops almost to 0 psi (0 bar). Looking at the figures, the spring 65 now pushes the piston 60 towards the left so that the inlet ports 72 and 76 and outlet ports 71 and 75 are blocked by the piston 60 and inlet port 74 and outlet port 73 open and communicate through chamber 64. As a result the oil returning from the CVT is re-circulated through the spool valve 50 back to the boost pump 44 which continues to supply the CVT with oil at an appropriate pressure. Because oil leaks from the CVT, an accumulator 42 is activated to maintain a sufficient flow of oil. Oil is forced out of the accumulator 42 by a combination of pressurized air flowing through its inlet 43 as well as suction created by the boost pump 44. The duration for which this system can operate depends on the size of the accumulator 42. Calculations show that the system 30 can operate up to 25 seconds in an adverse "g" condition.

Once normal operation returns, pressure in the sump rises and the piston 60 moves to the right until its returns to its original position. At this time the accumulator is recharged.

Although the invention has been described in terms of an IDG used on an aircraft, it will be appreciated by those skilled in the art that the invention can be used for any hydraulically controlled mechanical system that may experience adverse "g" conditions. Accordingly, various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A hydraulic control system for an integrated drive generator having a constant speed drive variable transmission for maintaining oil pressure to the transmission during an adverse "g" event, comprising:

an oil sump;

a scavenge pump for suctioning oil from said sump;

a boost pump for pumping a portion of the oil from the scavenge pump to the transmission; and a spool valve disposed between said scavenge pump and said boost pump, and between a fluid return from said transmission and said scavenge pump, said spool valve operable in a first position where said portion of oil from said scavenge pump flows through said valve to said boost pump and said return flow from said transmission flows through said valve to said scavenge pump and a second position where return flow from said transmission is re-circulated through said spool valve back to said boost pump.

2. The system of claim 1 further comprising an oil accumulator disposed between said spool valve and said boost pump.

3. The system of claim 2 wherein said oil accumulator supplies oil when said spool valve is in said second position and is refilled when said spool valve is in said first position.

4. The system of claim 1 wherein said spool valve moves from said first position to said second position in response to a drop in oil pressure in said sump.

5. The system of claim 4 wherein said spool valve moves from said second position to said first position in response to a rise in oil pressure.

6. The system of claim 5 further comprising a pressure regulator disposed between said scavenge pump and said spool valve for maintaining a constant oil pressure to said spool valve when said spool valve is in said first position.

7. The system of claim 6 further comprising a heat exchanger disposed between said pressure regulator and said spool valve.

8. The system of claim 7 further comprising an air/oil separator disposed between said scavenge pump and said pressure regulator.

9. The system of claim 8 further comprising a supply pump disposed between said pressure regulator and said air/oil separator.

10. The system of claim 9 further comprising a bypass for flowing a second portion of said oil from said pressure regulator back to the inlet of said scavenge pump.

11. A method for providing hydraulic fluid to an integrated drive generator having a constant speed drive variable transmission comprising the steps of:

(a) during normal "g" conditions pumping said fluid from a sump to said transmission and returning said fluid from said transmission to mix with the fluid from said sump; and (b) sensing an adverse "g" condition and in response thereto cease pumping from said sump and re-circulating the fluid returning from said transmission back to said transmission in a closed loop mode.

12. The method of claim 11 further comprising the step of (c) sensing when said "g" conditions have returned to normal and in response thereto cease re-circulating said return fluid and resume pumping fluid from said sump.

13. The method of claim 12 further comprising between steps (b) and (c) the step of adding additional fluid to said re-circulating fluid.

14. The method of claim 13 further comprising after step (c) the step (d) of ceasing to add additional fluid to said re-circulating fluid.

15. The method of claim 14 wherein said adding step includes the step of deplenishing a fluid accumulator.

16. The method of claim 14 further comprising after step (d) the step of recharging said accumulator.

* * * * *